United States Patent [19]

Kageyama

[11] Patent Number: 4,960,739
[45] Date of Patent: Oct. 2, 1990

[54] A METHOD FOR PRODUCING A MATERIAL FOR USE IN A MICROWAVE DIELECTRIC RESONATOR

[75] Inventor: Keisuke Kageyama, Egawa, Japan

[73] Assignee: Sumitomo Special Metal Co., Ltd., Japan

[21] Appl. No.: 478,715

[22] Filed: Feb. 8, 1990

Related U.S. Application Data

[63] Continuation of Ser. No. 213,718, Apr. 22, 1988, abandoned, which is a continuation-in-part of Ser. No. 82,911, Aug. 10, 1987, abandoned, which is a continuation-in-part of Ser. No. 740,530, Jun. 3, 1985, abandoned.

[30] Foreign Application Priority Data

Jun. 8, 1984 [JP] Japan ................................. 59-118907

[51] Int. Cl.$^5$ ............................................. C04B 35/46
[52] U.S. Cl. .................................... 501/137; 501/134; 501/135; 501/136; 501/138; 501/139
[58] Field of Search ............... 501/134, 135, 136, 137, 501/138, 139

[56] References Cited

U.S. PATENT DOCUMENTS 3,938,064 2/1976 O'Bryan, Jr. et al. ............... 501/137
4,477,581 10/1984 Nishioka et al. ..................... 501/137

FOREIGN PATENT DOCUMENTS 0504112 7/1954 Canada ................................. 501/137

Primary Examiner—William R. Dixon, Jr.
Assistant Examiner—Anthony J. Green
Attorney, Agent, or Firm—Watson, Cole, Grindle & Watson

[57] ABSTRACT

A dielectric material for use in a microwave resonator comprises 78.1 mol % of $TiO_2$, 15.7 to 17.8 mol % of BaO, 4.00 ml % of $SnO_2$ and at least one of 0.1 to 1.0 mol % of SrO and 0.1 to 1.2 mol % of CaO.

6 Claims, No Drawings

METHOD FOR PRODUCING A MATERIAL FOR USE IN A MICROWAVE DIELECTRIC RESONATOR

CROSS REFERENCE TO RELATED APPLICATION

The present application is a continuation-in-part application of application Ser. No. 082,911, filed Aug. 10, 1987, now abandoned, which was a continuation application of application Ser. No. 740,530, filed June 3, 1985, now abandoned.

BACKGROUND OF THE INVENTION

1. Field of the Invention:

This invention relates to a material for a microwave dielectric resonator.

2. Description of the Prior Art:

The development of new media for communications has necessitated the use of small, digital electronic parts and devices. There is a particularly strong demand for small and reliable parts for communication systems employing microwaves, such as communication satellites and automobile telephones. Conventional microwave circuits employ cavity resonators and waveguides as filters and transmission lines, which essentially rely on the stability of air or vacuum as a wave propagation medium. In order to reduce the sizes of these parts, it has been found possible to use a propagation medium having a higher permittivity and a higher temperature stability as compared to that of air or vacuum. In this regard, the propagation wavelength of microwaves in a medium is expressed as $$(1/\sqrt{\epsilon_r}:$$

$\epsilon_r$ relative permittivity) and its resonance wavelength is also expressed as $$1/\sqrt{\epsilon_r}.$$

It is, therefore, possible to reduce the sizes of those parts.

Various types of ceramics are known for making microwave dielectric resonators. They include $CaZrO_3$, $SrZrO_3$, $CaTiO_3$—$MgTiO_3$, $Ba_2Ti_9O_{20}$ and $BaTi_4O_9$, e.g., as disclosed in the article "$Ba_2Ti_9O_{20}$ as a Microwave Dielectric Resonator" in the Journal of the American Ceramic Society, 1975, Vol. 58, No. 9-10, pp. 418–420 and in the article "Dielectric Characterization of $Ba_2Ti_9O_{20}$ type Ceramics at Microwave Frequencies" in the Philip Journal of Research, 1983, Vol. 38, No. 6, pp. 295–311. The first three types of ceramics have a relatively widely ranging temperature coefficient of permittivity including zero, but a low relative permittivity of only, for example, 20. The last two types have a relatively high relative permittivity of, for example, 40, but their temperature coefficient of permittivity is not as low as zero—see U.S. Pat. No. 3,938,064 and the above-mentioned article in the Journal of the American Ceramic Society. Also, they are liable to reduction and difficult to sinter as disclosed in the article "Effect of Mn Doping on the Dielectric Properties of $Ba_2Ti_9O_{20}$ Ceramics at Microwave Frequency" in Japanese Journal of Applied Physics, 1983, Vol. 22, No. 6, pp. 1125–1128.

In the event a dielectric resonator is used as a filter, the shape of the filter and the expansion of metals, such as of a metal casing for the filter and cables, have a noticeable effect on the temperature coefficient of resonance frequency of the filter as a whole. Those metals make a positive contribution to the temperature coefficient of resonance frequency.

There have also been proposed $BaO$—$SnO_2$—$TiO_2$ and $BaO$—$ZrO_2$—$TiO_2$ types of ceramics. They are, however, both limited in temperature coefficient of permittivity. Their temperature coefficients of resonance frequency are only as low as about zero. It is difficult to obtain any such type of ceramics having a negative temperature coefficient of resonance frequency. In order to lower the temperature coefficient of the filter as a whole, therefore, it is necessary to use for the dielectric resonator itself a material having a negative temperature coefficient which makes up for that of those metals.

SUMMARY OF THE INVENTION

It is an object of this invention to provide a ceramic material for a microwave dielectric resonator which has a high permittivity, a small dielectric loss in a high frequency range and a widely ranging temperature coefficient of permittivity, and which is easy to manufacture because of its resistance to reduction and its ease of sintering.

This object is attained by a material which comprises 78.1 mol % of $TiO_2$, 4.00 mol % of $SnO_2$, 15.7 to 17.8 mol % of $BaO$, and at least one of 0.1 to 1.0 mol % of $SrO$ and 0.1 to 1.2 mol % of $CaO$. The inventive material has a high permittivity, i.e., of about 38, a small dielectric loss, i.e., of 5000–6000, and a temperature coefficient of resonance frequency ranging widely, i.e., from −25 ppm/° C. to +10 ppm/° C.

EXAMPLE

A variety of ceramic samples were prepared from $TiO_2$, $BaCO_3$, $SnO_2$, $SrCO_3$, and $CaCO_3$, which were all of 99.5% or higher purity. They were mixed for five hours in a ball mill in the mixing ratios shown in TABLE 1. Each of the resulting mixtures was dried and calcined at 1000° C. for an hour. The calcined mixture was crushed and dried, and the crushed material was pelletized with 1% by weight of an organic binder. The resulting pellets were compacted and the compacted material was fired at a temperature of 1360° C. to 1380° C. to form a sintered product having a diameter of 11 mm and a thickness of 9 mm.

Each of the sintered products was examined for relative permittivity $\epsilon_r$, dielectric loss Q and temperature coefficient of resonance frequency Tf at 25° C. and 4 GHz. The results are shown in TABLE 1. The relative permittivity and dielectric loss shown in TABLE 1 were determined by the dielectric resonator method. The temperature coefficient of resonance frequency Tf has the following relationship to the temperature coefficient of permittivity $T_\epsilon$ and the coefficient $\alpha$ of linear thermal expansion of the ceramics:

$$T_f \times -\tfrac{1}{2}T_\alpha - \alpha$$

The results shown in the TABLE confirm that the dielectric ceramic materials of the present invention have a small dielectric loss, a high permittivity, and a widely ranging temperature coefficient of resonance frequency.

TABLE 1

| Sample No. invention | Composition (mol %) | | | | | Sintering Temp. °C. | Characteristics | | |
|---|---|---|---|---|---|---|---|---|---|
| | $TiO_2$ | BaO | $SnO_2$ | SrO | CaO | | $\epsilon_r$ | Q | $\tau_f$ |
| 1 | 78.1 | 17.3 | 4 | 0.6 | — | 1360 | 38 | 5700 | −10 ppm/°C. |
| 2 | 78.1 | 17.1 | 4 | 0.8 | — | 1360 | 38 | 5800 | −12 ppm/°C. |
| 3 | 78.1 | 17.3 | 4 | 0.3 | 0.3 | 1380 | 38 | 5600 | −25 ppm/°C. |
| 4 | 78.1 | 17.2 | 4 | 0.2 | 0.5 | 1380 | 38 | 5600 | −15 ppm/°C. |
| 5 | 78.1 | 17.4 | 4 | — | 0.5 | 1370 | 38 | 5600 | −20 ppm/°C. |
| 6 | 78.1 | 16.9 | 4 | — | 1.0 | 1380 | 38 | 5800 | 2 ppm/°C. |
| 7 | 78.1 | 16.9 | 4 | 1.0 | — | 1370 | 38 | 5700 | −10 ppm/°C. |
| 8 | 78.1 | 17.8 | 4 | — | 0.1 | 1380 | 38 | 5300 | −2 ppm/°C. |
| 9 | 78.1 | 16.7 | 4 | — | 1.2 | 1370 | 38 | 5800 | 5 ppm/°C. |
| 10 | 78.1 | 17.8 | 4 | 0.1 | — | 1360 | 38 | 5600 | 4 ppm/°C. |
| Comparative | | | | | | | | | |
| 11 | 79.2 | 15.8 | 4 | 1 | — | 1380 | 38 | 5000 | 58 ppm/°C. |
| 12 | 74.8 | 16.2 | 8.5 | — | 0.5 | 1350 | 37 | 4000 | 65 ppm/°C. |
| 13 | 78.0 | 14.7 | 3.5 | 1.7 | 2.1 | 1360 | 38 | 3500 | 25 ppm/°C. |
| 14 | 81.3 | 14.9 | 2.0 | 1.8 | — | 1380 | 40 | 3800 | 72 ppm/°C. |
| 15 | 76.5 | 16.2 | 5 | — | 2.3 | 1360 | 39 | 5200 | 68 ppm/°C. |

I claim:

1. A method of producing a dielectric material for use in a microwave dielectric resonator which includes the steps of (1) providing a mixture of initial ingredients from which a dielectric material containing 78.1 mol % $TiO_2$, 15.7 to 17.8 mol % BaO and 4.00 mol% $SnO_2$ can be produced, (2) providing a mixture of final ingredients by adding at least one compound selected from the group consisting of $SrCO_3$ and $CaCO_3$ to the mixture of initial ingredients so that the produced dielectric material will include at least one of 0.1 to 1.0 mol% SrO and 0.1 to 1.2 mol % CaO, the dielectric material thereby having a permittivity of about 38 and a temperature coefficient of resonance frequency of between −25 ppm/° C. and +10 ppm/° C., (3) drying and calcining the mixture of final ingredients, (4) crushing, drying, pelletizing compacting and firing the dried and calcined mixture of final ingredients to form the dielectric material.

2. A method according to claim 1, wherein an amount of $CaCO_3$ is added to the mixture of initial ingredients so that the produced dielectric material includes 0.3 to 1.2 mol% of CaO and the dielectric material has a temperature coefficient of permittivity Tf of −20 to +10 ppm/° C.

3. A method according to claim 1, wherein an amount of $SrCO_3$ is added to the mixture of initial ingredients so that the produced dielectric material includes 0.5 to 1.0 mol% of SrO, said dielectric material having a temperature coefficient of permittivity Tf of −15 to 0 ppm/°°C.

4. A method according to claim 1, wherein amounts of $SrCO_3$ and $CaCO_3$ are added to the mixture of initial ingredients so that produced dielectric material includes 0.1 to 0.6 mol% of SrO and 0.1 to 0.6 mol% of CaO, said dielectric material having a temperature coefficient of permittivity Tf of −25 to 0 ppm/° C.

5. A method according to claim 1, wherein the dielectric material has a dielectric loss Q of 5000 to 6000.

6. A method according to claim 5, wherein the dielectric material has a dielectric loss Q of 5300 to 5800.

* * * * *